May 21, 1946.  H. A. ADAMS  2,400,676

PUMP

Filed Nov. 29, 1943

INVENTOR.
Harold A. Adams

Patented May 21, 1946

2,400,676

UNITED STATES PATENT OFFICE 2,400,676

PUMP

Harold A. Adams, Bakersfield, Calif.

Application November 29, 1943, Serial No. 512,236

3 Claims. (Cl. 103—218)

My invention relates to the coolant pump driving mechanism and has for its main object the effective rotation of the pump through a mechanical drive system, which is adjustable for various conditions of wear, mounting facilities, and volume of coolant output. The coolant medium, either used for the purpose of evaporating or as a liquid refrigerant in a compressor system, frequently is circulated by means of an auxiliary electric motor driven pump.

The electric motor and current conducting wires are particularly susceptible to failure under the conditions of excessive water vapor and water. My invention provides a pump drive which is mechanically operated by frictional drive and which, furthermore, is easily and quickly adaptable to varying requirements of output and motive power.

As the present war conditions make it impossible or extremely difficult and disadvantageous to use or secure metals and certain other materials, either for repair or construction of new products, my invention is designed to use the minimum quantities of scarce, war-important materials by substituting to the greatest possible extent therefor non-critical construction items such as wood, formed plastics, fibre and other available products.

Additional objects and advantages of my invention will be apparent from the following description considered in conjunction with the accompanying sheet of drawings or from both as supplements of each other, wherein are set forth certain novel features of construction, combination and arrangement of parts.

In the accompanying sheet of drawings forming a part of these specifications, and in which like numerals are employed to designate like parts:

Figure 2:
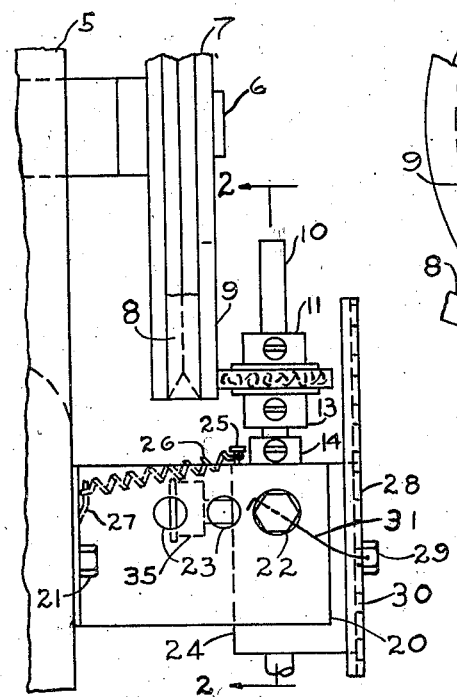
Figure 2 is a sectional view of the friction drive and positioning means, together with the pivoting and bearing mechanisms.
Figure 2:
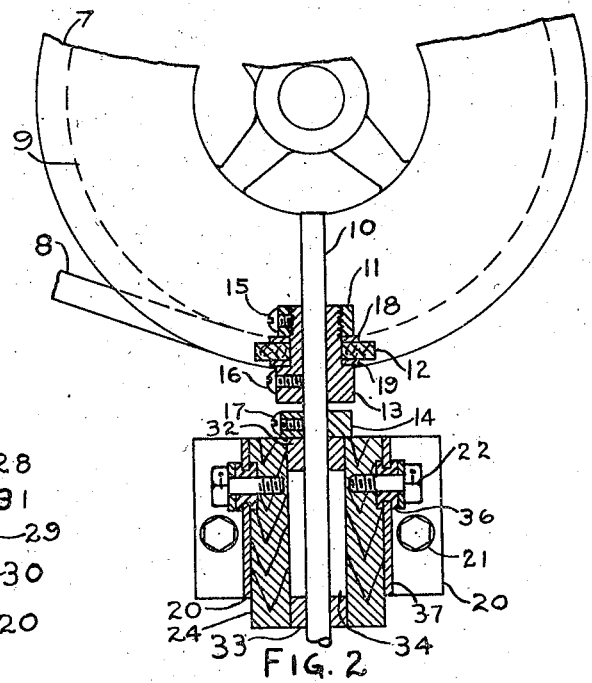
Figure 1:
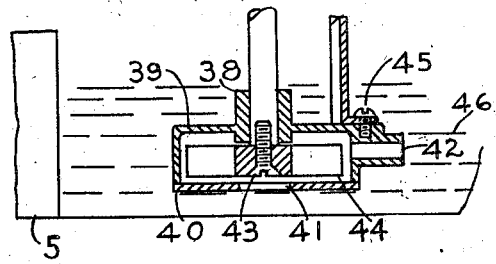
Figure 1 is a side elevation, partly sectional, of a pump-driving mechanism constructed in accordance with my invention and illustrating mainly the frictional drive members, the horizontal and vertical adjusting means and the tension device.
Figure 3:
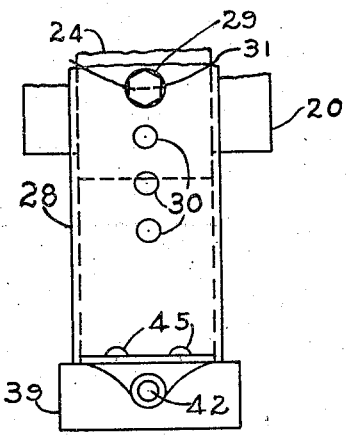
Figure 3 is a fragmentary front elevation illustrating mainly the vertical adjusting means.
Figure 4:
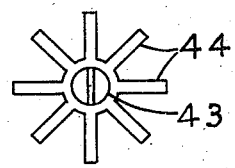
Figure 4 is a bottom plan view of a pump impeller.

Referring now in detail to the Figures 1, 2, 3, and 4, wherein for purposes of illustration are shown preferred embodiments of my invention, the numeral 5 designates the housing of a conventional ventilating fan, from which extends the fan drive shaft 6, to which is secured the pulley 7, driven by belt 8 connected to a source of power. A side surface 9 of the pulley 7, if suitable, is machined to a flattened area of appreciable extent, or a circular plate of washer-like form may be attached to the side of pulley 7. This pulley side surface 9 acts as the driving element of a friction drive and extends from the perimeter of the pulley 7 such a distance toward the shaft 6 as to permit the point of contact of the driving and driven friction members to be varied in position on pump shaft 10 towards or from the pulley shaft 6 for the purposes of decreasing or increasing the revolutions of the driven friction disc 12. By this provision for adjusting the speed of the driven disc 12 and the resultant change in speed of the pump shaft 10 and pump impeller 44 attached thereto, an accurate and predetermined liquid output of the pump may be obtained.

Bearing against the pulley surface 9 under pressure resulting from tension spring 26 is the driven friction disc 12 constructed of fibre, leather, rubber or other suitable material. The friction disc 12 is securely clamped on sleeve 13 between washers 18 and 19 by nut 11, which when sufficiently tightened is locked in position by set screw 15.

Sleeve 13 is adjustably secured at the desired position on pump drive shaft 10 by set screw 16.

To pump shaft 10 is secured collar 14, locked by set screw 17 at such position on shaft 10 as to correspond with the vertical mounting position on supporting frame 28 and allow the pump assembly to be submerged in the liquid at the proper depth by its action as a thrust collar resting on bearing 32 and supporting the weight of the shaft 10, the pump impeller 44 and other parts secured to shaft 10.

Upper bearing 32 and lower bearing 33 are secured in spaced relation in body block 24 with the intervening space 34 forming a grease chamber around shaft 10. A grease cup 35 is attached to body block 24 and extends therethrough to grease chamber 34. Releasably secured in body block 24 are supporting pivots 22 extending through sound absorbing resilient grommets 37 which are inserted in the appropriate mounting holes 23 of brackets 20 and secured therein in spaced relation.

In mounting brackets 20 are located a plurality of mounting holes 23, of which, on installation of the pump, the appropriate one may be selected for insertion of the supporting pivots 22, so that the complete assembly of pump, supporting frame and driven friction disc may be adjusted in spaced horizontal relationship to secure the best operating position of the pump in respect to the driving pulley frictional surface 9, the air conditioner ventilating fan housing 5, and the liquid reservoir 46.

Brackets 20 are releasably secured to housing 5 by bolts 21 or other conventional means. A catch hook 27 is provided for securing one end of tension spring 26, the other end of which is secured to pin 25, fastened to body block 24. The function of spring 26 is to exert a continuous pull on body block 24 due to the free swinging action of pivots 22, thus forcing the driven disc 12 against the driving surface 9 and providing compensation for wear of driver 9 and driven disc 12. While I have attained continuous contact of the frictional disc surfaces by means of a tension spring, it is recognized that the same effect may be secured by an appropriately positioned weight, compression spring or other conventional means.

Body block 24 is secured at an appropriate location to supporting frame 28 by bolt 29 and also at an appropriate location the pump housing 39 is secured to supporting frame by screws 45. Supporting frame 28 is provided with a plurality of mounting holes 30 of which, on installation of the pump, the appropriate hole may be selected through which bolt 29 secures supporting frame 28 to the body block so that the complete assembly of pump-supporting frame and the driven friction disc may be adjusted in spaced vertical relationship in coordination with the adjustment of the pump impeller to secure the best operating position of the pump in respect to the driving pulley frictional surface 9, the air conditioner ventilating fan housing 5 and the liquid reservoir 46.

Wire latch 31 is inserted through holes in bolts 22 and 29 to prevent loosening.

To shaft 10 is securely fastened pump impeller 44 by screw 43. Surrounding a portion of shaft 10 and impeller 44 a bearing section 38 and pump housing 39 and closing plate 40 are secured in spaced relationship to supporting frame 28 by screws 45. Closing plate 40 is provided with an inlet 41 and housing 38 is provided with an outlet 42.

In adapting my invention to existing or re-used pumps impellers of curved or other conventional shapes may be used, though impeller vanes 44 of a parallel radial type are preferred, as liquid flow will then result from either clockwise or counter-clockwise revolution of the impeller.

The paramount advantage of a frictional driving device for circulating liquid pumps of an air conditioner, which affords inbuilt simple means of vertical and horizontal positioning and which is operable in either rotational direction, should be beneficial and useful, not only for the purpose of simplifying new installations, but particularly for reconditioning and replacing in service at minimum expense and loss of installation time many of the air conditioning devices now rendered inoperative through inability to obtain, because of war conditions, the proper materials and parts for repairing the defective items.

It will be understood that while the form of my frictional drive for air conditioner liquid circulating pumps herein illustrated and described is to be considered as a preferred embodiment of my invention, I do not limit myself to the precise constructions as disclosed, but reserve the right to resort to and substitute various modifications and changes in shape, size and arrangement of parts without departing from the spirit of my invention or the scope of my claims as described and indicated above and in the drawing and the following claims.

Having thus described my invention I claim:

1. In a pump consisting of a driving surface, an adjustable driven disc, a shaft operated by said driven disc, a liquid pump, a pump impeller operated by said shaft, a body block supporting said shaft, mounting brackets, pivots inserted in said body block and mounting brackets, sound absorbing grommets supporting said pivots; a perforated frame supporting said liquid pump in an adjustible parallel relationship with said driving surface and a spring securing said liquid pump in a continuously tensed angular operative relationship with said driving surface.

2. In a pump consisting of a friction drive mechanism comprising in combination, a driving surface, a driven disc adjustable as to speed and direction of rotation, a shaft operated by said driven disc, a pump impeller attached to said shaft, a pump housing surrounding said pump impeller; provided with plural bearings; a body block secured within said plural bearings in an adjustible parallel relationship with said driving surface; a frame provided with plural positioning holes securing said body block in an adjustable spaced liner relationship with said driving surface and a spring attached to one of said mounting brackets and said body block, so that said tension spring continuously exerts force to maintain frictional contact between said driving surface and said driven disc.

3. In a pump consisting of a driving surface, a shaft, a friction disc mounted on the shaft, a pump impeller secured to said shaft and a pump housing surrounding said impeller; means for adjustably securing the friction disc to the shaft in such spaced relationship that the speed of said friction disc may be predetermined as selected; a body block; a collar adjustably securing the shaft in the body block in a parallel spaced relationship with the driving surface; mounting brackets provided with a plurality of holes adjustably securing said body block in a spaced relationship parallel with the driving surface; a tension spring holding said disc under stress in spaced angular relationship with the driving surface; a liquid medium reservoir; a supporting frame provided with a plurality of mounting holes securing said pump and pump housing in an adjustable parallel and linear spaced relationship with the driving mechanism and the liquid medium reservoir; all coacting and cooperating to maintain the friction disc, pump impeller and pump housing in such parallel, angular and linear spaced relationship with the driving surface and the liquid medium reservoir that operative functioning of the driving surface effects automatic movement of the liquid medium.

HAROLD A. ADAMS.